United States Patent
Chakraborty et al.

(10) Patent No.: US 8,194,830 B2
(45) Date of Patent: Jun. 5, 2012

(54) METHOD FOR PREDICTING CHURNERS IN A TELECOMMUNICATIONS NETWORK

(75) Inventors: Dipanjan Chakraborty, Kolkata (IN);
Koustuv Dasgupta, New Delhi (IN);
Sougata Mukherjea, New Delhi (IN);
Amit A. Nanavati, New Delhi (IN);
Rahul Singh, Amherst, MA (US); Balaji Viswanathan, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1165 days.

(21) Appl. No.: 12/020,865

(22) Filed: Jan. 28, 2008

(65) Prior Publication Data
US 2009/0192809 A1 Jul. 30, 2009

(51) Int. Cl.
*H04M 15/06* (2006.01)
*H04B 7/02* (2006.01)
*G06Q 10/00* (2012.01)

(52) U.S. Cl. ............ 379/112.01; 370/208; 375/316; 379/88.01; 379/114.01; 379/201.01; 455/405; 463/17; 703/27; 705/7.29; 705/7.31; 705/38; 705/348

(58) Field of Classification Search ............ 345/440; 379/88.01, 112.01, 114.01, 201.01; 455/405; 463/17; 703/2, 27; 705/7.29, 7.31, 38, 348, 705/1; 370/208; 375/316
See application file for complete search history.

(56) References Cited

U.S. PATENT DOCUMENTS

| | | | | |
|---|---|---|---|---|
| 5,822,410 | A | * | 10/1998 | McCausland et al. ... 379/114.01 |
| 5,907,800 | A | * | 5/1999 | Johnson et al. ............ 455/405 |
| 6,038,303 | A | * | 3/2000 | Sanford et al. .......... 379/201.01 |
| 6,080,202 | A | * | 6/2000 | Strickland et al. ............ 703/27 |
| 6,643,645 | B1 | * | 11/2003 | Fayyad et al. ................. 1/1 |
| 7,246,125 | B2 | * | 7/2007 | Bradley et al. ................ 1/1 |
| 7,336,599 | B2 | * | 2/2008 | Hwang et al. ............... 370/208 |
| 7,751,499 | B2 | * | 7/2010 | Olsson et al. .............. 375/316 |
| 2002/0198782 | A1 | | 12/2002 | Shorter |
| 2003/0200135 | A1 | | 10/2003 | Wright |
| 2004/0039593 | A1 | * | 2/2004 | Eskandari .................... 705/1 |
| 2006/0143027 | A1 | | 6/2006 | Jagannathan et al. |
| 2006/0146992 | A1 | * | 7/2006 | Paden et al. ............. 379/88.01 |
| 2007/0118419 | A1 | * | 5/2007 | Maga et al. ............... 705/10 |
| 2007/0118498 | A1 | | 5/2007 | Song et al. |
| 2007/0156673 | A1 | * | 7/2007 | Maga et al. ................ 707/5 |

(Continued)

FOREIGN PATENT DOCUMENTS
WO WO 2006/040405 A1 4/2006

OTHER PUBLICATIONS

Au, W. et al. "A Novel Evolutionary Data Mining Algorithm with Application to Churn Prediction." IEEE Transaction on Evolutionary Computation, 7, 6, pp. 532-545, 2003.

(Continued)

*Primary Examiner* — Gerald Gauthier
(74) *Attorney, Agent, or Firm* — Ryan, Mason & Lewis, LLP

(57) ABSTRACT

Data pertaining to interactions between a plurality of customers is obtained. A graph is formed, having a plurality of nodes representing the customers and a plurality of edges representing interactions between the customers. A sub-set of the customers are denoted as previously churned customers. A spreading activation model is applied to the graph to identify, based on the graph and the previously churned customers, the potential churning customers.

10 Claims, 9 Drawing Sheets

U.S. PATENT DOCUMENTS

| | | | |
|---|---|---|---|
| 2007/0185867 A1* | 8/2007 | Maga et al. | 707/6 |
| 2008/0058056 A1* | 3/2008 | Johnson | 463/17 |
| 2009/0048965 A1* | 2/2009 | Kraemer et al. | 705/38 |
| 2009/0141028 A1* | 6/2009 | Arora et al. | 345/440 |
| 2009/0144032 A1* | 6/2009 | Arora et al. | 703/2 |
| 2009/0190729 A1* | 7/2009 | Chakraborty et al. | 379/112.01 |
| 2009/0192809 A1* | 7/2009 | Chakraborty et al. | 705/1 |
| 2009/0285322 A1* | 11/2009 | Imamura et al. | 375/267 |

OTHER PUBLICATIONS

Blackstrom, L. et al "Group Formation in Large Social Networks: Membership, Growth and Evolution," In Proceedings of ACM SIGKDD, Philadelphia, PA, USA, 2006.

Barabasi, A. et al, "Emergence of Scaling in Random Networks" Science, 286, pp. 509-512, 1999.

Brin, S. "The Anatomy of a Large-scale Hypertextual Web Search Engine." In Proceedings of Seventh International WWW Conference, Brisbane, Australia, 1998.

Burt, R "Structural Holes: The Social Structure of Competition." Harvard, 1992; pp. 65-103.

Clauset, A. et al "Finding Community Structure in Very Large Networks" Physical Review E, 70, 066111 (2004).

Domingos, P et al "Mining the Network Value of Customers" In Proceedings of ACM CIMK, San Francisco, CA, USA, 2001.

Euler, T "Churn Prediction in Telecommunications using Miningmart." In Proceedings of the Workshop on Data Mining and Business, DMBiz, 2005.

Girvan, M et al. "Community Structure in Social and Biological Networks." In Proceedings of National Academy of Science, 99, 2002, pp. 7821-7826.

Goldenberg, J. et al "Talk of the Network: A Complex Systems Look at the Underlying Process of Word of Mouth" Marketing Letters, 12:3, 2001, pp. 211-223.

Granovetter, M. "The Strength of Weak Ties." American Journal of Sociology, 78(6), 1973, pp. 1360-1380.

Guha, R. et al. "Propagation of Trust and Distrust." In Proceedings of WWW Conference, New York, NY, USA, 2004.

Hoff, P. et al. "Latent Space Approaches to Social Network Analysis." Journal of the American Statistical Association, 97, 2002.

Kamvar, S. et al. "The EigenTrust Algorithm for Reputation Management in P2P Networks." In Proceedings of WWW Conference, Budapest, Hungary, 2003.

Kautz, H. et al. "ReferralWeb: Combining Social Networks and Collaborative Filtering." Communications of ACM, 40:3, 1997, pp. 63-66.

Kempe, D et al "Maximizing the Spread of Influence Through a Social Network" In Proceedings of ACM CIKM, Washington, DC, USA, 2003.

Kleinberg, J. "Authoritative Sources in a Hyperlinked Environment." In Proceedings of ACM SODA, Baltimore, MD, USA, 1998.

Kumar, R. et al. "Structure and Evolution of Online Social Networks," In Proceedings of ACM SIGKDD, Philadelphia, PA, USA, 2006.

Levien, R. et al. "Attack-resistant Trust Metrics for Public Key Certification." In Proceedings of USENIX Security Symposium, San Antonio, TX, USA, 1998.

Lu et al.; "Link-based Classification"; Proceedings of the Twentieth International Conference on Machine Learning (ICML-2003), Washinginton DC, 2003.

MacSkassy, S. "Classification in Networked Data: A Toolkit and a Univariate Case Study." Journal of Machine Learning Research, May 8, 2007: 935-983.

Mahajan, V. et al. "New Product Diffusion Models in Marketing: A Review and Directions for Research." Journal of Marketing, 54:1, 1990. pp 1-26.

Milgram, S. "The Small World Problem" Psychology Today, vol. 2, 1967, pp. 60-67.

Mozer M. et al "Predicting Subscriber Dissatisfaction and Improving Retention in Wireless Telecommunications Industry" IEEE Transactions on Neutral Networks, 11 2000 pp. 690-696.

Nanavati, A. et al. "On the Structural Properties of Massive Telecom Call Graphs: Findings and Implications" In Proceedings of ACM CIKM, Arlington, VA, USA, 2006.

Newman, M. "The Structure and Function of Complex Networks" SIAM Review, 45, 2003, pp. 167-256.

Young, H.P. "The Diffusion of Innovations in Social Networks." Santa Fe Institute Working Paper, 02-04-018, 2002.

Richardson, M. et al. "Trust Management for the Semantic Web." In Proceedings of the Second International Semantic Web Conference, Sanibel Island, FL, USA, 2003.

Richardson, M et at Mining Knowledge Sharing Sites for Viral Marketing. In Proceedings of ACM CIKM, Edmonton, Alberta, Canada, 2002.

Sarkar, P. et al. "Dynamic Social Network Analysis Using Latent Space Models" ACM SIGKDD Explorations Newsletter, vol. 7, Issue 2, 2005, pp. 31-40.

Birke, D et al.; "Network Effects, Network Structure and Consumer Interaction in Mobile Telecommuniations in Europe and Asia"; Nottingham University Business School.

Ziegler, C et al "Spreading Activiation Models for Trust Propagation" In Proceedings of the IEEE International Conference on e-Technology e-Commerce and e-Service Taipei Taiwan 2004.

"WEKA 3: Data Mining Software" downloaded at http://www.cs.waikato.ac.nz/ml/weka.

"Churn Reduction in the Telecom Industry—DMNews," downloaded at http://www.dmnews.com/Churn-reduction-in-the-telecom-industry/article/94238/.

en:Primer (3 4 6)—WekaDoc; http://weka sourceforge net/wekadoc/index.php/en:Primer.

"Social Network Analysis, A Brief Introduction"; Orgnet.com, http://www orgnet.com/sna.html.

"Social Network"; http://en.wikipedia.org/wiki/Social_network.

Sen et al "Link-based Classification" ; Department of Computer Science, University of Maryland.

* cited by examiner

FIG. 7

| FEATURE SET | FEATURE NAME |
|---|---|
| USAGE | TOTAL CALL FREQUENCY |
| | NUMBER OF OUTGOING CALLS |
| | NUMBER OF INCOMING CALLS |
| | TOTAL CALL VOLUME (SECONDS) |
| | TOTAL INCOMING CALL DURATION (SECONDS) |
| | TOTAL OUTGOING CALL DURATION (SECONDS) |
| | NUMBER OF UNIQUE INCOMING, OUTGOING EDGES |
| | NUMBER OF UNIQUE NEIGHBORS |
| | NUMBER OF INCOMING, OUTGOING CALLS TO/FROM A DIFFERENT OPERATOR'S NETWORK |
| | TOTAL INCOMING CALL DURATION FROM A DIFFERENT OPERATOR'S NETWORK (SECONDS) |
| | TOTAL OUTGOING CALL DURATION TO A DIFFERENT OPERATOR'S NETWORK (SECONDS) |
| | TOTAL INCOMING, OUTGOING EDGES TO/FROM A DIFFERENT OPERATOR'S NETWORK |
| | TOTAL NUMBER OF NEIGHBORS IN A DIFFERENT OPERATOR'S NETWORK |
| | CALL VOLUME PERCENTAGE (W.R.T. TOTAL) TO/FROM A DIFFERENT OPERATOR'S NETWORK |
| | CALL FREQUENCY PERCENTAGE (W. R. T. TOTAL) TO/FROM A DIFFERENT OPERATOR'S NETWORK |
| CONNECTIVITY | TOTAL CALL FREQUENCY TO/FROM CHURNER NEIGHBORS |
| | TOTAL CALL VOLUME TO/FROM CHURNER NEIGHBORS (SECONDS) |
| | CALL VOLUME AND FREQUENCY PERCENTAGES (W.R.I. TOTAL) TO/FROM A CHURNER |
| | MAXIMUM CALL VOLUME, FREQUENCY TO/FROM A CHURNER NEIGHBOR |
| | NUMBER OF UNIQUE CHURNER NEIGHBORS |
| | PERCENTAGE OF CHURNER NEIGHBORS (W. R. T. TOTAL NEIGHBORS) |
| | NUMBER OF NON-CHURNER NEIGHBORS WHO HAVE CHURNERS AS NEIGHBORS |
| | MAXIMUM CALL VOLUME AND FREQUENCY WITH ANY OF THESE NON-CHURNERS |
| | CALL VOLUME AND FREQUENCY PERCENTAGES (W.R.T. TOTAL) TO/FROM THESE NON-CHURNERS |
| INTERCONNECTIVITY | NUMBER OF ADJACENT PAIRS IN THE SET OF CHURNER FRIENDS, i.e., CONNECTED BY AN EDGE |
| | NUMBER OF PAIRS IN THE SET OF CHURNER FRIENDS CONNECTED BY A PATH LENGTH OF 2 |
| | NUMBER OF PAIRS OF CHURNER FRIENDS CONNECTED BY A PATH THAT ONLY INCLUDES CHURNERS |
| | TOTAL CALL FREQUENCY ON EDGES CONNECTING ADJACENT CHURNER FRIENDS |
| | TOTAL CALL VOLUME ON EDGES CONNECTING ADJACENT CHURNER FRIENDS |

METHOD FOR PREDICTING CHURNERS IN A TELECOMMUNICATIONS NETWORK

CROSS-REFERENCE TO RELATED APPLICATION(S)

The present application is related to a commonly assigned U.S. application entitled "System and Computer Program Product For Predicting Churners In A Telecommunications Network," identified by Ser. No. 12/020,928, and filed on even date herewith, the disclosure of which is incorporated by reference herein in its entirety.

FIELD OF THE INVENTION

The present invention relates to the electrical electronic and computer arts, and, more particularly, to telecommunications and the like.

BACKGROUND OF THE INVENTION

In today's extremely challenging business environment, many telecommunications carriers are measuring their success by the size and growth of their profit margins. As a result, carriers are under intense pressure to reduce or eliminate the major threats to these margins, which arise from revenue leakage, inaccurate inter-carrier billing, fraud, and churn. Carriers rely on analysis of terabytes of Call Detail Record (CDR) data to help them make business-critical decisions that will positively affect their bottom Sine. High-end data warehouses and powerful Business Intelligence (BI) solutions are thus becoming essential tools to help carriers meet profit goals. Analyzing and integrating in-depth data enables carriers to reduce revenue leakage and churn, mitigate fraud, optimize network usage and increase profits.

Interestingly, as mobile penetration is increasing and even approaching saturation, the focus of telecom BI is shifting from customer acquisition to customer retention. Estimates indicate that it is much cheaper to retain an existing customer than to acquire a new one. To maintain profitability, telecom service providers must control churn, that is, the loss of subscribers who switch from one earner to another. In some instances, annual churn rates in the prepaid segment may average between a significant 50 to 70 percent. This implies that the operator must offer the right incentives, adopt die right marketing strategies, and place network assets appropriately to protect its customers.

SUMMARY OF THE INVENTION

Principles of the present invention provide techniques for predicating churners in a telecommunications network. In one aspect, an exemplary method (which can be computer implemented) for identifying potential churning customers, includes the steps of obtaining data pertaining to interactions between a plurality of customers; forming a graph having a plurality of nodes representing the customers and a plurality of edges representing interactions between the customers; denoting a sub-set of the customers as previously churned customers; and applying a spreading activation model to the graph to identify, based on the graph and the previously churned customers, the potential churning customers.

One or more embodiments of the invention or elements thereof can be implemented in the form of a computer product including a computer usable medium with computer usable program code for performing the method steps indicated. Furthermore, one or more embodiments of the invention or elements thereof can be implemented in the form of an apparatus including a memory and at least one processor that is coupled to the memory and operative to perform exemplary method steps. Yet further, in another aspect, one or more embodiments of the invention or elements thereof can be implemented in the form of means for carrying out one or more of the method steps described herein; the means can include hardware module(s), software module(s), or a combination of hardware and software modules.

One or more embodiments of the invention may offer one or more technical benefits; for example, allowing the telecom operator to pro-actively identify potential churners and pursue them for retention, based on "early warnings." For example, subscriber John Smith can be identified as a potential target as soon as a number of his close friends churn. In some instances, John Smith's calling patterns (e.g. number of calls made, call volume etc.) might not exhibit any distinguishing features that would otherwise flag him as a potential churner.

These and other features, aspects and advantages of the present invention will become apparent from the following detailed description of illustrative embodiments thereof, which is to be read in connection with the accompanying drawings.

BRIEF DESCRIPTION OF THE DRAWINGS

FIGS. 3A and 3B depict exemplary tie strength distribution for, respectively, ah pairs, and churner-churner pairs; while

FIG. 7 presents a table with an exemplary feature set;

DETAILED DESCRIPTION OF PREFERRED EMBODIMENTS

Figure 1B:
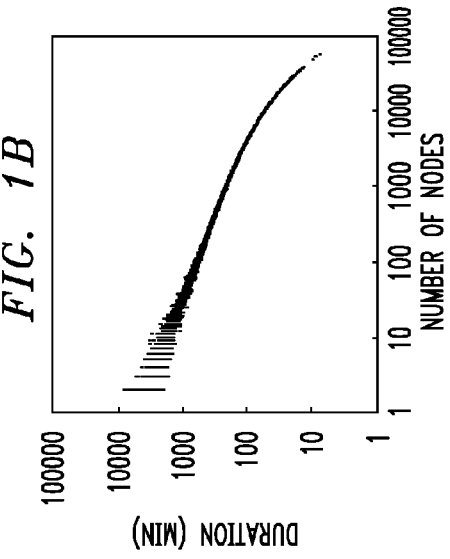
FIGS. 1A through 1D depict, respectively, degree distribution, call volume distribution, call frequency distribution, and call duration distribution of an exemplary mobile call graph.

Social Network Analysts (SNA) has emerged as a key paradigm in modern sociology, technology, and information sciences. The paradigm stems from the view that the attributes of an individual in a network are less important than his or her ties (relationships) with other individuals in the network. Exploring the nature and strength of these ties can help understand the structure and dynamics of social networks and explain real-world phenomena, ranging from organizational efficiency to the spread of information and disease.

An application of an exemplary embodiment of the invention, set forth herein, examines the communication patterns of millions of mobile phone users, allowing study of the underlying social network in a large-scale communication network. The embodiments herein address the role of social ties in the formation and growth of groups, or communities, in a mobile network. In particular, the evolution of churners in an operator's network spanning over a period of four months (it being understood that this time frame is exemplary and non-limiting) was studied. Analysis indicates the propensity of a subscriber to churn out of a sendee provider's network depending on the number of ties (friends) that have already churned. One or more inventive embodiments provide a spreading activation-based technique that predicts potential churners by examining the current set of churners and their underlying social network. The efficiency of the prediction can be expressed as a lift curve, which indicates the fraction of all churners that can be caught when a certain fraction of subscribers were contacted.

Retrieving information from Call Detail Record (CDR) data can provide business insights for designing appropriate marketing strategies; for example, by constructing a graph and predicting potential churners using techniques set forth hereinafter, marketing employees of a telecommunications company can contact at least some customers who may be likely to churn and can try to offer them appropriate incentives to remain loyal.

A CDR contains various details pertaining to each call, for example, who called whom, when was the call made, and so on. Based on this information, a call graph can be constructed, with customer mobile numbers as nodes and the calls as edges. The weight of an edge captures the strength of the relationship (tie) between two nodes. An edge with a high weight (for example, call frequency or call volume) signifies a strong tie, while an edge with a low weight represents a weak one. Consequently, one can view the call graph as a social network including n actors (nodes) and a relationship $R_{i,j}$ measured on each ordered pair of actors i,j=1, ..., n.

In the example presented herein, a call graph is considered that might be obtained from CDR data of a large mobile telephony operator. An objective is to explore the local and global structure of the underlying social network in this massive communication graph, and understand the role of social relationships as it pertains to die formation of groups (or communities) in the network. Understanding the structure and dynamics of social groups is a natural goal for network analysis, since such groups tend to be embedded within larger social network structures, growing in a potentially complex fashion. For example, a group that grows through aggressive recruitment of friends by other friends would appear as a subgraph branching out rapidly over time, while a group in which the decision to join depends relatively little on such influence might appear as a collection of disconnected components growing in a motley fashion.

One significant question that is addressed is whether the decision of a subscriber to churn out of the operator's network is dependent on the existing members of the community that the subscriber has a relationship with (referred to as friends). A social relationship between two friends, in this context, is based on the duration of voice calls, call frequency, and so on, that are exchanged during a certain period. Analysis techniques disclosed herein explore the propensity of a subscriber to churn out of a service provider's network depending on the number of friends that have already churned. For example, consider a subscriber Joshua. His friend has recently churned out of the operator's network. What is the probability of Joshua to churn? Flow would the probability change if Joshua had another friend who is also a churner? In at least some instances, social ties play an important role in affecting customer churn. One or more inventive embodiments provide a prediction model that explores the social network of the churners to identify customers susceptible to churn in the (near) future.

The problem of churn prediction has been addressed by academicians as well as BI practitioners. Traditional solutions have used data mining techniques that create a customer profile from the customer's calling pattern (often described by hundreds of variables), and then predict the probability of churn based on certain attributes of the subscriber. For these customers, there are various data sources available for modeling, including historical usage, billing, payment, customer service, application, and credit card data.

In some instances, a mobile operator may be interested in developing a churn prediction model for its prepaid segment, for which there exists very little data except for CDR data. Potentially interesting items that may be extracted from such data may include, for example, aggregated call usage information for each customer, along with the call destination numbers, and call frequency and duration for each destination. Thus, a prediction model to be applied in such a case should be substantially based on the available link information. Moreover, business rules and data availability restrictions imposed by operators may, in some circumstances, limit the amount of CDR data to design and validate any prediction technique (for example, to a single month). Such practical limitations certainly make the problem more challenging, but one or more exemplary inventive embodiments demonstrate how reasonable prediction accuracy can still be achieved using only link information. To do so, a diffusion (or spreading activation)-based approach is disclosed herein, which is based on the premise that a few key individuals (churners) may lead to strong "word-of-mouth" effects, wherein they influence their friends to churn, who in turn spread the influence to others, and so forth.

One or more exemplary inventive embodiments differ from existing approaches where, typically, a customer is flagged when there is noticeable change in his recent usage profile (e.g. reduced spending, prepaid card not recharged etc.)—by which time he might have already decided to churn, and such embodiment(s) may provide a value-add, where social network analytics can complement and enhance existing BI solutions for churn management.

Purely for purposes of an illustrative, non-limiting example, consider the Call Detail Record (CDR) data of a large mobile operator for a one-month period. The data set is about 60 Gigabytes large and contains detailed information about voice calls, short message service (SMS), value-added calls, etc. of users. Analysis of the illustrative embodiments is based on a representative region in a typical operator's network and all intra-region (local) calls made during the specified period. In other instances, the analysis could be based on other factors, such as other regions or other sets of calls.

The raw CDR data contains about $3.1 \times 10^6$ nodes and about $12.3 \times 10^6$ edges. Calls within 5 seconds are assumed to be accidentally dropped and filtered out. Further, a pair of nodes A and B are included, if and only if, A calls B and B calls A. While a single call between two individuals may not carry much information, reciprocal calls of long duration (or high frequency) serve as a signature of a social relationship. Therefore, in order to translate the data into a network representation that captures the characteristics of the underlying communication network, a directed edge <A,B> is considered if there has been at least one reciprocated edge <B,A> between the nodes, i.e., A called B, and B called A. If they are connected by a pair of reciprocal edges then they are typically referred to as individual friends i. The weight $W_{AB}$ of a directed edge <A,B> is the aggregate of all calls made by A to B.

During pre-processing, the service numbers are excluded, e.g. an operator's customer service number, number for retrieving voice mail, and numbers similar to 1-800 (toll free) numbers. It was observed that these numbers skewed the call distributions in the operator's network. The omission of these numbers resulted in the removal of about 450 nodes and about $1.2 \times 10^6$ edges. The final (reciprocal) call graph contained about $2.1 \times 10^6$ nodes and about $9.3 \times 10^6$ directed edges. Overall, the reciprocal graph contains about $32.1 \times 10^6$ calls and total call duration of about $955 \times 10^3$ hours.

Overall characteristics of the call graph (in this example, for the month of March), referred to as $G_{March}$, are summarized. After the characteristics are summarized, using churner data available from an operator, the role of social ties (influences) in affecting churn in the prepaid customer segment is highlighted.

Figure 1D:
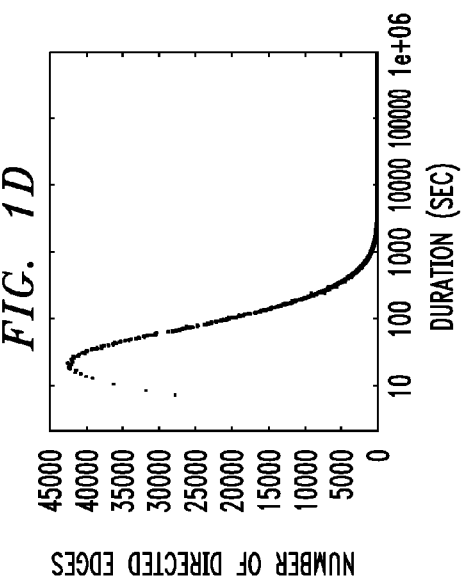
Figure 1A:
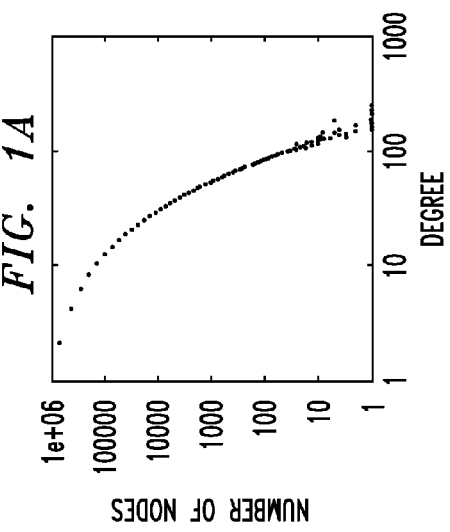
Figure 1C:
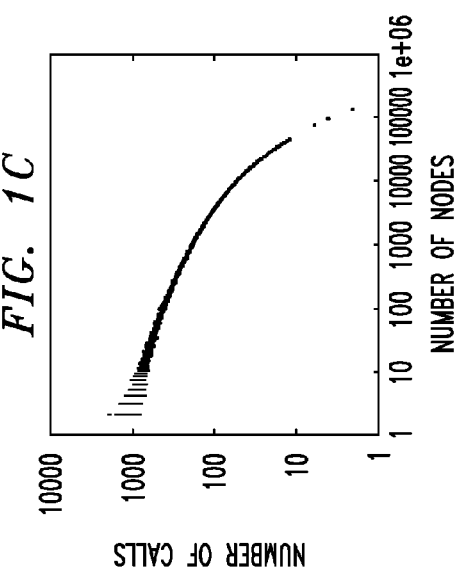

FIGS. 1A-1D summarize the basic structural properties of the call graph. As expected, the call graph is found to be characterized by presence of a highly heterogeneous topology, with degree distribution characterized by wide variability and heavy tails. The log-log plot in FIG. 1A shows that the degree distribution fits well to a power law distribution. The power law exponent, in specificity, is about 2.91. The trend implies that most pre-paid customers call a relatively smaller number of people (friends), while a small number of individuals have relationships with a large group of people. Such a skewed distribution is also observed for the (node) call volume and (node) call frequency distributions, as shown in FIGS. 1B and 1C, respectively. FIG. 1D illustrates the distribution of call durations, obtained from the call duration of each directed edge in the graph. The plot shows that most calls in the mobile network are short-lived, while a few dozen of calls last for hours. Interestingly, the distribution exhibits a peak at around 1 minute. This reflects a caller's tendency to finish a conversation within 60 seconds (which is the pulse rate of the operator for charging voice calls in the prepaid segment). It is to be emphasized that FIGS. 1A-1D represent one specific application of inventive techniques, and that such techniques can be applied to sets of data with different characteristics.

Next, the community of churners in the mobile network is addressed. Exemplary analysis is based on the churners between the months of April and July and their observed interactions in the call graph of March. The observation period is a month ahead of the churn period and hence contains a large portion of churner calls, which can be used to approximate the social network(s) of these churners. Table 1 gives the number of churners in different months. Note that there are quite a few subscribers who have churned but who are not captured in the CDR data, simply because they did not make or receive calls in March. The objective of the present embodiment is to gauge the role of social influences with respect to churn. In this example, findings strictly based on churners with CDR data in March are evaluated.

TABLE 1

Churner Population during April to July

| Month | Churners with CDRs |
|---|---|
| April | 44266 |
| May | 42458 |
| June | 65796 |
| July | 58565 |

Figure 2A:
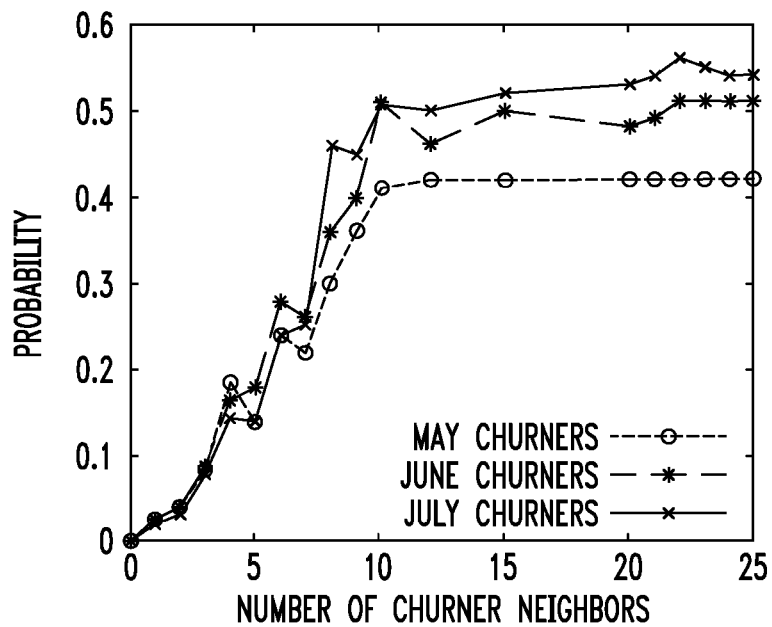
FIGS. 2A and 2B depict, respectively, an exemplary probability of churning when k friends have already churned and when adjacent pairs of friends have already churned.

To understand the characteristics of churn behavior and relate it to a diffusion process, a need exists to find out whether there is any evidence of influences in affecting a customer to churn. The underlying premise, in this case, is that an individual's probability of adopting a new behavior increases with the number of friends that have already engaged in the behavior—to be specific, the number of friends who have churned in an earlier period (e.g. the previous month). FIG. 2A illustrates this relationship, and an associated probability P(k) is computed and plotted on the vertical axis as a function of the number of churner neighbors. One technique that can be used to compute P(k) is known to the skilled artisan from L. Backstrom, D, Huttenlocher, J. Kleinberg, and X. Lan, Group Formation in Large Social Networks: Membership, Growth and Evolution, in *Proceedings of ACM S1GKDD* (Philadelphia, Pa., USA, 2006), which is expressly incorporated herein by reference in its entirety for all purposes. For the churners of May, first consider churners of April. Find all triples <u,C,k> such that C is the set of churners in April, u is a user who has not churned in April, and u has k friends in C, P(k), for a given k, is then the fraction of all such triples <u,C,k>, such that u belongs to C in May. Similarly, for June churners, compute P(k) by considering April and May churners, and so on.

Figure 2B:
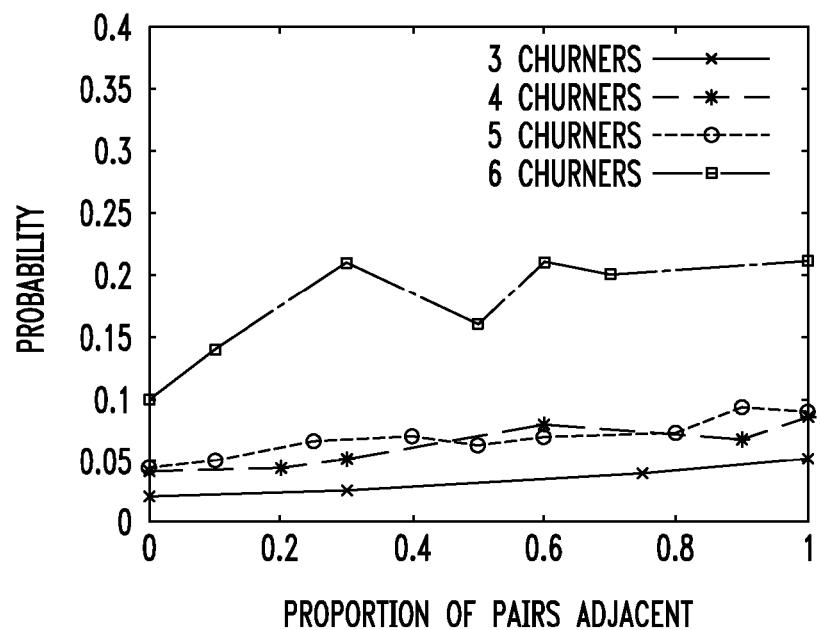

Surprisingly, the curves indicate that the probability of churn is significantly influenced by the number of friends who have churned in previous months. In fact, the probabilities increase if an individual has these friends churning over subsequent months, hinting towards a cascading effect of these influences. To gain further insight, the probability of churning as a function of the internal connectedness of friends who have churned is also measured. The results reveal that individuals whose churner friends are linked to each other are significantly more likely to churn, as shown in FIG. 2B. Stated otherwise, the probability of churn is not only affected by the number of churner friends that one has, but also the local topology connecting these friends. This result tends to indicate that churn as a "behavior" could be attributed to diffusion models that posit very simple dynamics by which influence is transmitted in a (highly) connected social network.

Figure 3A:
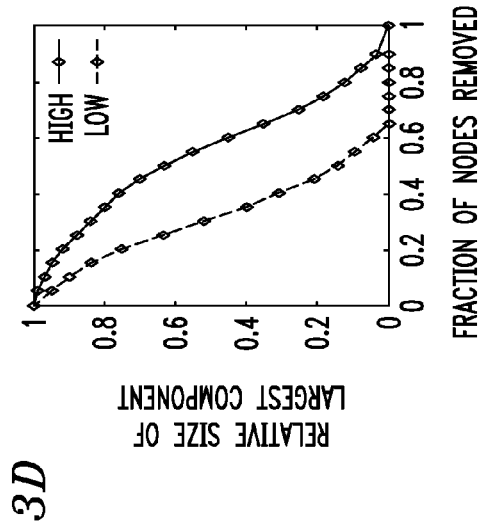
Figure 3B:
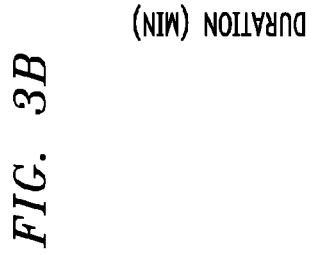

FIG. 3A shows the distribution of tie strengths in the mobile network, where tie strength is defined as the sum of the weights of the edges <A,B> and <B,A>. The tie strengths show wide variability and a heavy-tail, indicating that while the majority of ties correspond to a few minutes of air time, a small fraction of users spend hours chatting with each other. Interestingly, the distribution is similarly skewed (with respect to strong and weak ties), considering churner pairs only, as in FIG. 3B.

Figure 3C:
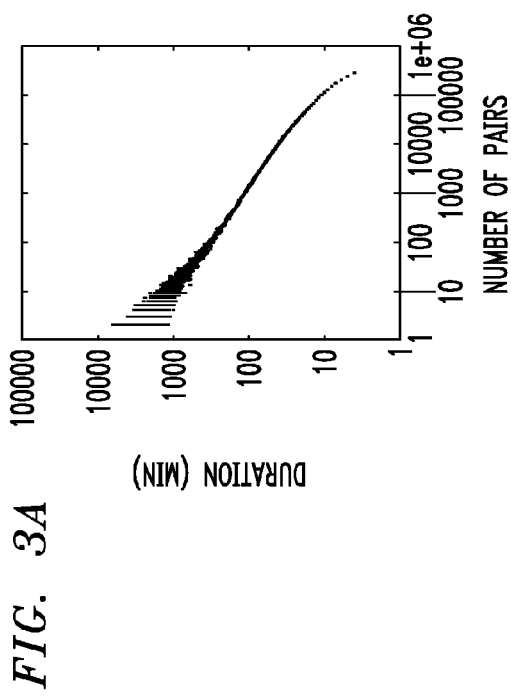
FIGS. 3C and 3D depict, respectively, the exemplary stability of a call graph with respect to removal of links based on tie strengths, and neighborhood overlap.
Figure 3D:
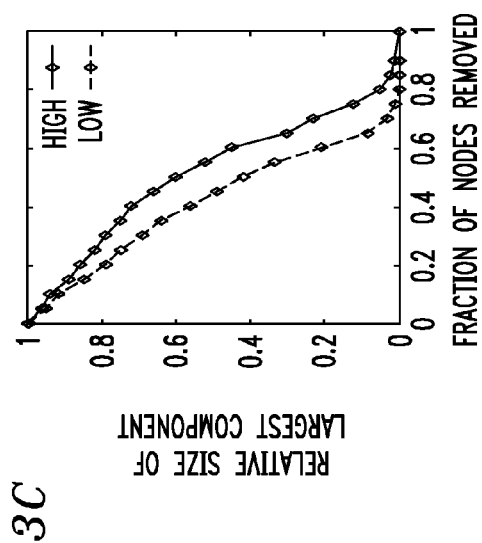

In a different context, sociological principles suggest that the strength of a tie could depend only on the dyad, i.e. the relationship between two individuals (independent of the network), or alternatively, be dependent on the network, i.e. friendship circles, resulting in the importance of the weak ties in connecting communities. To understand the implications of this relationship between tie strength and the local network structure, one needs to explore the network's ability to withstand the removal of either strong or weak ties. The relative size of the giant component, providing the fraction of nodes that can all reach each other through connected paths, is measured as a function of the fraction of removed links f. FIG. 3C demonstrates the effect of removing links in order of strongest (or weakest) link. The relative topological overlap of the neighborhood of two users A and B, representing the proportion of their common friends, as $O_{AB}=N_{AB}/((K_A-1)+(K_B-1)-N_{AB})$, where $N_{AB}$ is the number of common neighbors of A and B, and $K_A(K_B)$ denotes the degree of node A(B), is also measured. If A and B have no common acquaintances, then $O_{AB}=1$. FIG. 3D demonstrates the effect of removing links in order of strongest (or weakest) overlaps. In both cases, findings reveal that removing ties in rank order of weakest to strongest ties will lead to a sudden integration of the network. In contrast, reversing the order shrinks the network without precipitously breaking it apart.

Thus, tie strength is driven not only by the Individuals involved in the tie, but also by the network structure In the tie's immediate vicinity. Further, given that the strong ties are predominantly within communities, their removal will only locally disintegrate a community, while the removal of the weak links will delete bridges that connect different communities, leading to a network collapse. Yet further, embodiments of this invention assume that the observed local relationship, between network topology and tie strength, affects any global information diffusion process (like churn). In fact, it is believed that churn as a behavior can be viewed less as a dyadic phenomenon, (affected only be strong churner-churner ties), but more as a diffusion process where both strong and weak ties play a significant role in spreading the influence through the network topology.

One or more embodiments of the invention exploit social ties to identify potential churners in an operator's network. The approach is as follows. Start with a set of churners (e.g. for April) and their social relationships (ties) captured in the call graph (for March). Using the underlying topology of the call graph, initiate a diffusion process with the churners as seeds. Effectively, a "word-of-mouth" scenario, where a churner influences one of his neighbors to churn, is modeled, from where the influence spreads to some other neighbor, and so on. At the end of the diffusion process, inspect the amount of influence received by each node. Using a threshold-based technique, a node that is currently not a churner can be declared to be a potential future one, based on the influence that has been accumulated. Finally, measure the number of correct predictions by tallying with the actual set of churners that were recorded for a subsequent month (e.g. for May). The diffusion model is based on Spreading Activation (SPA) techniques proposed in cognitive psychology and later used for trust metric computations, known to the skilled artisan, as exemplified by C. Ziegler, G. Lausen, Spreading Activation Models for Trust Propagation, in *Proceedings of the IEEE International Conference on e-Technology, e-Commerce, and e-Service*, (Taipei, Taiwan, 2004), which is expressly incorporated herein by reference in its entirety for all purposes. In essence, SPA is similar to performing a breadth-first search on the call graph $G_{March}=(V,E)$. Exemplary method steps are outlined hereinafter.

Node Activation

During each iterative step i, there is a set of active nodes. Let X be an active node which has associated energy $E(X,i)$ at step i. Intuitively, $E(X,i)$ is the amount of (social) influence (the terms "energy" and "influence" are used interchangeably in this context) transmitted to the node via one or more of its neighbors. A node with high Influence has a greater propensity to churn. Let $N(X)$ be the set of neighbors of X. The active nodes for step i+1 comprise those nodes which are neighbors of currently active members. Further, a currently active node X transfers a fraction of its energy to each neighbor Y (connected by a directed edge <X,Y>), in the process of activating it. The amount of energy that is transferred from X to Y depends on the spreading factor d and the transfer function F, respectively.

Spreading Factor

SPA starts with a set of active nodes (seed nodes) each having initial energy $E(X,0)$. At each subsequent step i, an active node transfers a portion of its energy $d \cdot E(X,i)$ to its neighbors, while retaining $(1-d) \cdot E(X,i)$ for itself, where d is the global spreading factor. Observe that the overall amount of energy in the network does not change over time, i.e. $\Sigma_X E(X,i) = \Sigma_{X \in V} E(X,0) = E(X,0) = E_0$, for each step i. The spreading factor determines the amount of importance associated with the distance of an active node from the initial seed node(s). Low values of d favor influence proximity to the source of injection, while high values allow the influence to also reach nodes which are further away. The choice of values for d is discussed below.

Energy Distribution

Once a node decides which fraction of energy needs to be distributed, the next step is to decide the fraction of the energy that is transferred to each neighbor. This is controlled by a transfer function F. In an exemplary, non-limiting embodiment, a linear edge weight normalization is used, i.e., the energy distributed along the directed edge <X,Y> depends on its relative weight $W_{XY}$ compared to the sum of weights of all outgoing edges of X. In other words, $E(X \rightarrow Y) = d \cdot F \cdot E(X,i)$, where $F = W(X,Y)/\Sigma_{<X,S> \in E} W(X,S)$. Embodiments of the invention assume that this definition of the transfer function blends intuitively with how influence spreads through/across a call graph. People may be believed to exert a much stronger influence on those to whom they speak for longer durations of time.

Termination Condition

Since the directed call graph contains cycles, the computation of energy values for all reachable nodes is inherently recursive. Several iterations for all nodes are required in order to make computed information. Suppose $Vi \subset V$ represents the set of nodes that have been discovered (activated) until step i—the process terminates when both of the following conditions are satisfied:

$$Vi = Vi-1 \quad (a)$$

$$\forall X \in Vi: E(X,i+1) - E(X,i) \leq E_T \quad (b)$$

i.e. when no new nodes have been activated and when changes in influence with respect to prior iterations are not greater than accuracy threshold $E_T$.

Next, proceeding to validate the approach discussed above using real churner data, consider the directed call graph $G_{March}$, with the churners as seed nodes. The weight of each directed edge in the graph is normalized between [0,1], using a function of the base form $F(x)=2/(1+e^{-x})-1$. Next, run the iterative SPA routine on this directed graph. After termination, each node in the network accumulates a certain energy value (influence). If not already a churner, this value reflects the propensity of the node to churn. Exemplary values for (normalized) initial energy, the aforementioned spreading factor, d, and the aforementioned accuracy threshold, $E_T$, are summarized in Table 2 below.

TABLE 2

SPA Parameters for Churn Prediction

| Parameter | Value(s) |
|---|---|
| Initial Energy $E_0$ | 1.0 |
| Spreading Factor d | 0.25-0.90 |
| Accuracy Threshold $E_T$ | 0.01 |

Since decision making ultimately requires a "churn" (i.e. likely to churn) or "no churn" (i.e. not likely to churn) prediction, in one or more embodiments, the continuous energy measure is thresholded to obtain a discrete predicted outcome. In some instances, the following simple threshold-based technique can be employed; fix a threshold $T_C$, and label a node X as "churn" if its energy is greater than the threshold; conversely, label the node as "no churn" if its energy is less than or equal to the threshold.

Figure 4A:
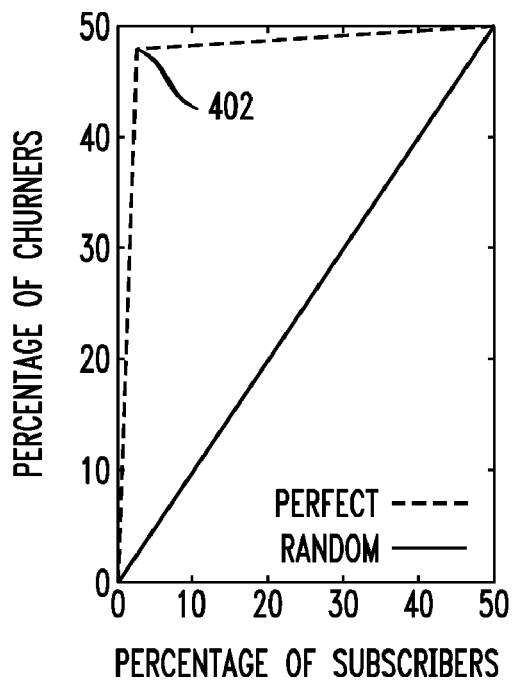
FIGS. 4A and 4B depict, respectively, illustrative lift curves and the exemplary effect of the spreading factor on performance of Spreading Activation (SPA)

Having predicted a list of potential churners, in one or more embodiments, an appropriate consideration is to quantity the accuracy of prediction, in the telecommunications industry, the outcome is often expressed using a lift curve. The lift curve is related to the ROC curve of signal detection theory and the precision-recall curve in information retrieval. The lift curve plots the traction of all churners having churn probability above the threshold $T_C$ against the fraction of all subscribers having churn probability above the threshold. The lift curve indicates the fraction of all churners that can be caught (retained) if a certain fraction of all subscribers were contacted. Note that an operator's customer services center only has a fixed number of personnel to contact some fraction of all subscribers. Hence, the lift curve, which can estimate the fraction of churners that can be caught given limited resources, is very useful. For ease of understanding one or more exemplary embodiments, FIG. 4A presents two sample lift curves—the lift curve representing perfect discrimination of churners from non-churners (best case), and that representing no discrimination (worst case). In general, the more the curve arches towards the upper-left corner of the graph, as shown at point 402 on the "perfect" graph, the better the predictor. Note that, in SPA, the fraction of subscribers contacted can be increased (decreased) by setting a low (high) threshold $T_C$.

For the sake of comparison, consider a simple churn prediction heuristic, based on tie strength, which works as follows: Consider the top K-percentile of churners, in terms of total call duration (incoming and outgoing). For each of these high-volume churners, and for a given variable k, identify the nodes which constitute the top k-percentile of the churner's tie strengths, i.e., the neighbors with whom the churners interact for longest duration. Label each of these neighbors as "churn". This is referred to hereinafter as the K-Ties heuristic. As before, by setting a large (or small) k, the heuristic can contact more (or less) subscribers. Lift curves obtained by using representative values of K and k can be compared with SPA, for purposes of illustrating one or more embodiments of the invention. Table 2, discussed above, lists the parameters used by SPA.

Figure 4B:
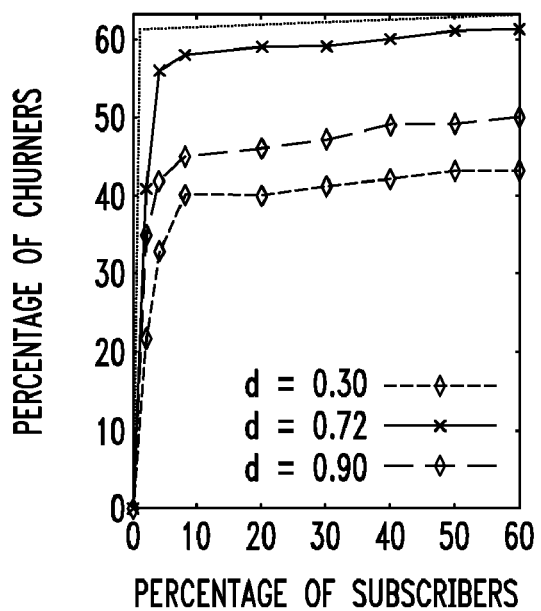

In one or more embodiments, it is of interest to understand the how the spreading factor d affects the performance of SPA. As discussed earlier, this determines the diffusion process in the network. A low value of d would facilitate rapid spread of the influence. A higher value, on the other hand, would imply that the influence takes a while to spread, often being trapped in highly connected localities (e.g. communities) of the network, before finding an escape to other parts of the network. For purposes of illustrating one or more inventive embodiments, results for three representative values, i.e. d=0.3, 0.72, 0.9, are depicted in FIG. 4B. The experiments were performed with April churners as the observation set, i.e. churners marked as seed nodes in the call graph. Further, the May-July churners were treated as the validation set, i.e. each "churn" prediction made by SPA was validated against the churner logs from these months to determine if the node actually churned in one of these months. In at least some instances, the lift curve improves by using a higher value of spreading factor, but it is not beneficial to use very large values of d. In one or more non-limiting exemplary embodiments, the best predictor is obtained by using a value of d=0.72. For the rest of the experiments, results are presented herein for a spreading factor of 0.72. It is to be emphasized that this value is exemplary, and other values can be used, as appropriate, in other embodiments.

Figure 5C:
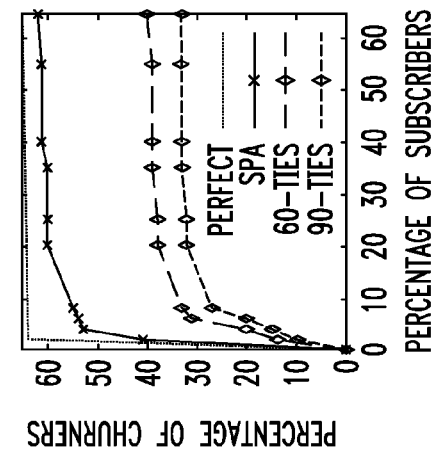
FIGS. 5A through 5C depict exemplary performance of SPA and K-Ties heuristic for different observation and validation periods.
Figure 5B:
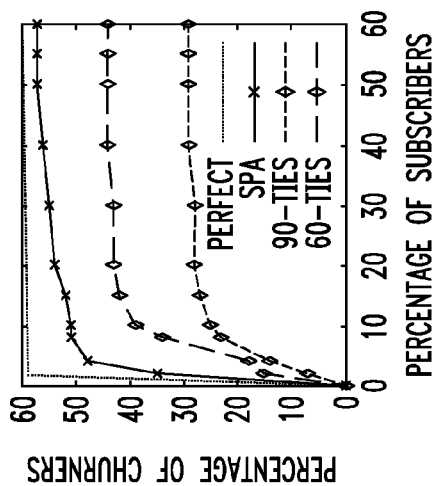
Figure 5A:
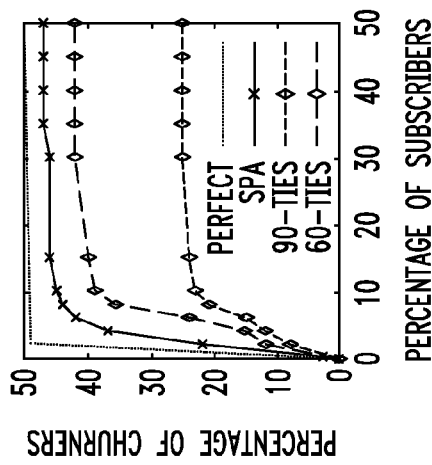

Again, purely for purposes of a non-limiting example, results from three sets of exemplary experiments are disclosed. In each experiment, the performance of SPA was compared with two instances of the K-Ties approach. In the 60-Ties heuristic, the top $60^{th}$-percentile of churners are considered and future churners are predicted, based on subscribers who fall within the top k (=10, 20, . . . 90, 99) percentile of the churner ties. Similarly, for the 90-Ties heuristic, the top $90^{th}$-percentile of churners and their strongest ties are considered. In FIGS. 5A, 5B, and 5C, the relative performances of SPA and K-Ties approaches are depicted for the following sets of experiments, respectively.

a) April churners as observation set, and May churners as validation set;

b) April-May churners as observation set, and June churners as validation set; and c) April-May-June churners as observation set, and July churners as validation set.

It can be seen that in the exemplary embodiments considered, SPA consistently outperforms K-Ties heuristic, in terms of the lift curve. This result agrees with the hypothesis that churn as a behavior is affected not only by strong ties between pairs of individuals (in particular, between an existing churner and a potential one), but by the network topology and its local relationship with strong and weak, ties, as well. Note that the 60-Ties heuristic performs much better than 90-Ties in the exemplary embodiment considered. In fact 60-Ties performs the best among all values of K (=10, 20, . . . , 90, 99) under the circumstances addressed—again, this is for purposes of illustrating one or more exemplary embodiments, and in other instances of the invention, other values of K may be appropriate. Note further that the relative differences between the lift curves obtained from SPA and 60(90)-Ties heuristics increase noticeably as the observation set becomes larger. Intuitively, this points to the underlying social network in the call graph, which grows richer (denser) over time, and can then be exploited to address interesting behavioral processes, like churn. Finally, the lift curves saturate beyond a certain point simply due to the inherent limit imposed by the number of ties (and influences) that can be explored, by starting from a set of seed churners. Note that the performance observed is for one particular non-limiting example, and other approaches may be appropriate in other applications.

Taking a closer look at the lift curves, it will be appreciated that SPA is generally successful in making correct predictions for about 50-60% of future churners, by contacting a relatively small fraction (10-20%) of the subscribers.

Figure 6:
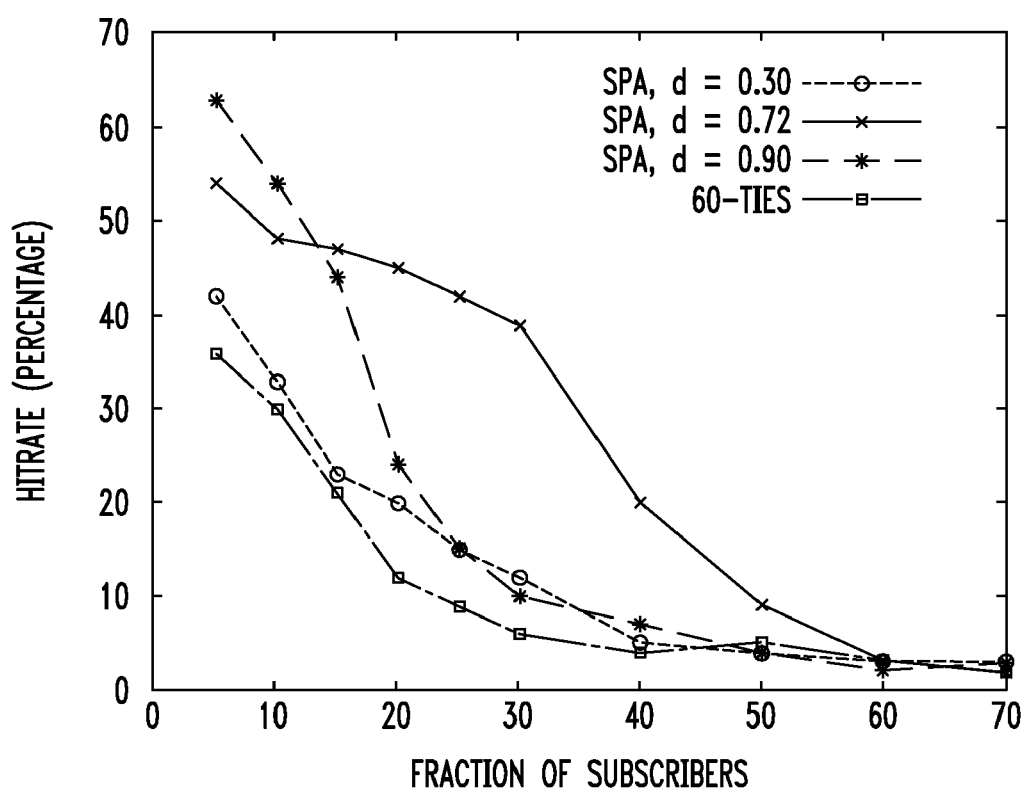
FIG. 6 depicts exemplary bit rates for SPA and K-Ties.

As used herein, hit rate can be defined to be the number of correct "churn" predictions, as a percentage of the total number of nodes labeled "churn". A low hit rate implies a large number of "false positives", and vice versa. With reference to FIG. 6, the hit rate of all approaches usually reduces as the number of subscribers contacted increases. It will be appreciated that 60-Ties has a low hit rate, while SPA (with spreading factor of 0.72) performs best. Note that SPA, with d=0.9, starts with a high hit rate (influence spreading rapidly through the network), but also suffers from rapidly diminishing returns as more subscribers are contacted. Near the right end of the X-axis, it even falls below 60-Ties. In view of this discussion, the skilled artisan will appreciate why very large values of d lead to inferior lift curves in FIGS. 5A-5C. Note also that, as before, the hit rate of SPA can be potentially improved by incorporating other properties and/or additional information (from CDR data or other data sources) In the decision making process.

It will be appreciated that one or more inventive embodiments achieve good prediction accuracy by using a simple diffusion-process that exploits social influences affecting churn. Recall that FIG. 2 estimates the probability of a customer churning given a single feature, i.e. the number of friends who have actually churned. While this is a single feature, the skilled artisan, given the teachings herein, will appreciate that a range of other features can be derived, related to the individuals themselves (extracted from CDR data), as well as features related to social ties in the underlying network. Such features include CDR information, like number of calls during a certain time of the day; ratio of long-lived calls (<10 minutes) to ratio of short-calls between a churner and his neighbor; ratio of incoming calls to outgoing calls between the churner and his neighbor, etc. By constructing a decision-tree model, one of the most common classification techniques, one can then estimate the probabilities of an individual to churn. Further, the predictions can be validated using churner information to compute a lift curve.

The table in FIG. 7 presents an exemplary feature set. As mentioned in the table, some of these features (or attributes) (i.e. usage attributes) are based purely on information extracted from CDR data. The second set of attributes (i.e. connectivity attributes) is based on the social ties of a (labeled) individual with existing (labeled) churners. Finally, the interconnectivity attributes are derived from die structural ties between these churners.

One non-limiting example of a program that can be used to obtain predictions, in one or more embodiments of the invention, is the J48 classifier implemented as part of WEKA, http://www.cs.waikato.ac.nz/ml/weka/. The WEKA implementation of J48 uses information gain to select attributes while growing the tree. As is known to the skilled artisan, decision trees represent a supervised approach to classification. The skilled artisan is familiar with the WEKA classifier package, and, given the teachings herein, can employ it to implement one or more inventive techniques.

Figure 8:
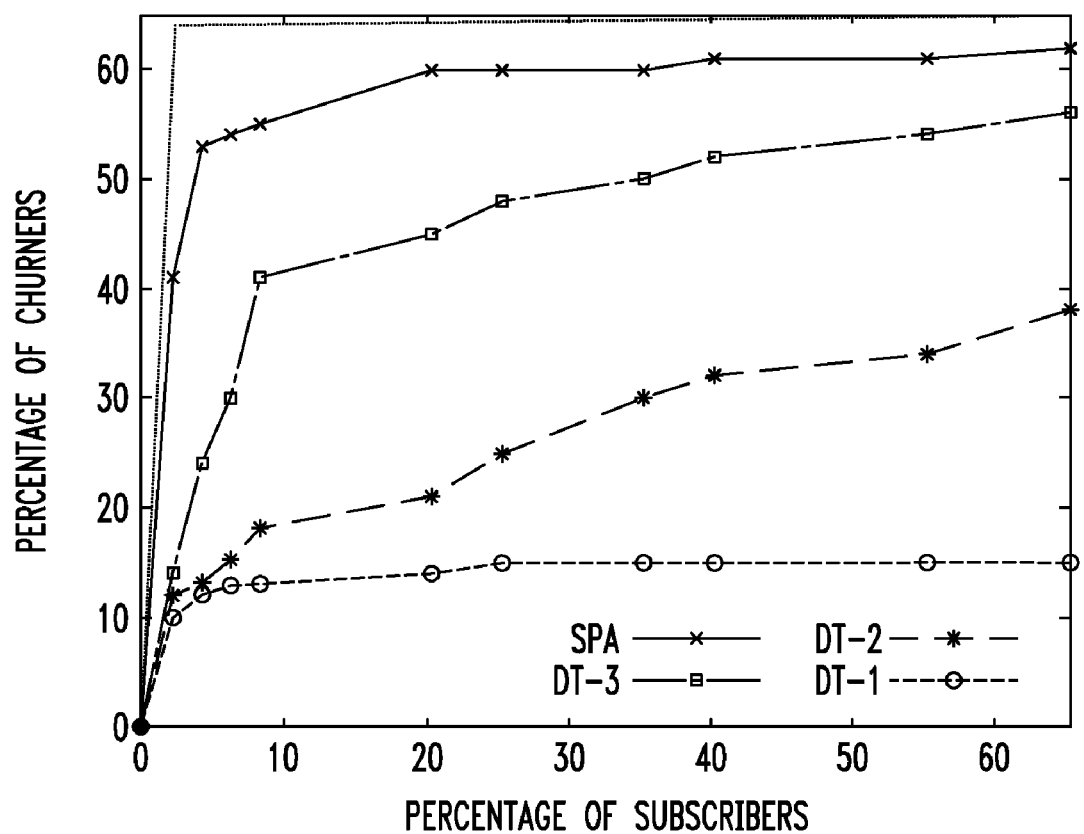
FIG. 8 depicts performance of decision tree-based approach compared to SPA.

The exemplary data set presented for illustrative purposes herein includes nodes in the March call graph, along with their attributes and "churn"/"no-churn" labels. Part of this data is used for training, after which unlabeled data in the test set is classified. FIG. 8 compares the lift curves obtained from a decision-tree based approach with SPA. Note that the features described above are intentionally chosen to understand which ones among the activity and/or structural features are more relevant. The results show that using a decision-tree technique with only usage attributes, i.e. DT-1, performs the worst. This simply implies that usage information based on prepaid CDR data is highly insufficient to perform any meaningful churn prediction. On the other hand, using the connectivity attributes along with usage attributes (DT-2), improves the lift curve by exploiting knowledge about direct or indirect relationships of an individual with the churner community. Note that adding the interconnectivity attributes, i.e. DT-3, significantly improves the performance of the lift curve. Note also that these features relate exclusively to the structure of the social network among the churners themselves—once again, corroborating the fact that churn depends not only on the relationships of an Individual with churners, but more importantly, on the structural relationships that are present between individuals in a social network setting. However, a traditional (label) attributes-based classifier loses out to SPA because it fails to adequately learn all the ties in the network neighborhood. To be more precise, links among the unlabeled data (or test set) can provide information that can help with classification. Similarly, links between labeled training data and unlabeled (test) data induce dependencies that should not be ignored.

Figure 9:
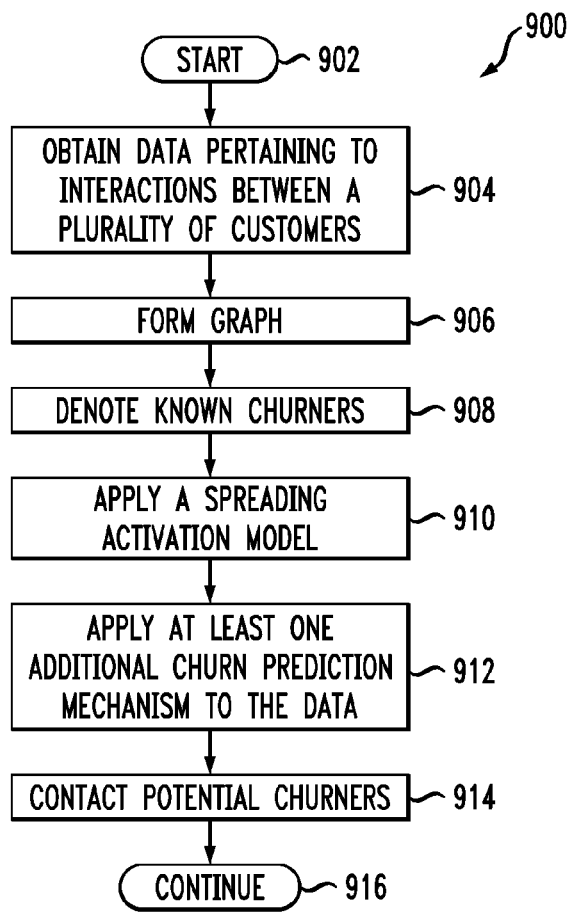
FIG. 9 is a flow chart of exemplary method steps.

Giving, attention now to flow chart 900 of FIG. 9, after beginning at block 902, an exemplary method for identifying potential churning customers includes, at block 904, obtaining data pertaining to interactions between a plurality of customers. At block 906, a graph is formed, having a plurality of nodes representing die customers and a plurality of edges representing interactions between the customers. At block 908, we denote a sub-set of the customers as previously churned customers. At block 910, we apply a spreading activation model to the graph to identify, based on the graph and the previously churned customers, the potential churning customers.

The potential churning customers can be identified as individuals and/or as members of groups. The step 910 of applying the spreading activation model can include the sub-step of applying weights to each of the plurality of edges based upon the nodes and the edges. In some instances, the graph further comprises subgraphs and the weights are further based upon the subgraphs. That is, a sub-graph that is densely connected can have higher weights on edges belonging to this sub-graph. This is because the sub-graph potentially includes a group of close friends (indicated by the fact that most of them call each other) and hence influence each other strongly. In the specific case, where the sub-graph is completely connected (i.e. a clique), the edge weights are the strongest. Similarly, a sparsely connected graph will have lower edge weights. The simplest way to do this is by linearly scaling the edge weight by a factor D, where D is the density of the sub-graph (defined as the ratio of number of edges to number of nodes).

The spreading activation model may be based upon a plurality of parameters, the parameters in turn being based upon the nodes, the edges, and the subgraphs. Exemplary parameters include initial energy of nodes associated with the previously churned customers; the fraction of energy propagated by each affected node to its neighboring nodes; a normalization function to determine a substantially exact amount of energy that each of the neighboring nodes receives from a corresponding one of the affected nodes; and an accuracy threshold for predicting that a given one of the affected nodes corresponds to a given one of the potential churning customers. An "affected node" is a node which acquires a finite amount of energy from an already energized node. In the first iteration, affected nodes are the direct neighbors of the churners, in the second iteration this set expands to include neighbors of nodes affected in the previous iteration, and so on. The normalization function can be, but need not be, linear in nature; any appropriate linear or non-linear function can be employed for normalization.

In some instances, as shown at block 912, we apply at least one additional churn prediction mechanism to the data, in which case the identification of the potential churning customers is based on the graph, the previously churned customers, and the at least one additional churn prediction mechanism. The spreading activation model and the at least one additional churn prediction mechanism can be integrated using at least one of a set intersection and a set union.

In some instances, as shown at block 914, an additional, step includes facilitating contact with at least a fraction of the potential churning customers to reduce a probability of the potential churning customers actually churning. In one or more preferred embodiments, the customers are telephony customers and the interactions are telephone calls. Processing continues at block 916.

As discussed above in the sections titled Node Activation, Spreading factor. Energy Distribution, and Termination Condition, the step of applying the spreading activation model can, in some instances, include the sub-steps of performing a plurality of iterative steps. Each of the iterative steps can in turn include activating a subset of the nodes of the graph, and assigning a spreading factor and a transfer function specifying a fraction of energy transferred by a given one of the subset of the nodes to corresponding neighboring nodes and a distribution of the transferred energy among the neighboring nodes. Iteration can cease when the subset of activated nodes does not substantially change between successive iterations and when changes in energy between iterations for a given node are less than a predetermined accuracy threshold.

In view of the discussion herein, it will be appreciated that Social Network Analysis (SNA) has emerged as an important paradigm for studying real-world, complex networks, and that social relationships play an influential role in affecting churn in the operator's network. One or more embodiments of the invention provide a simple, yet effective, diffusion-based approach that exploits these influences to identify a significant fraction of churners in the network. Influences, in some instances, are purely derived from call volumes between individuals. However, there are a number of graph-theoretic properties of nodes (edges) in the network that can be used to guide the diffusion process.

Exemplary System and Article of Manufacture Details

A variety of techniques, utilizing dedicated hardware, general purpose processors, firmware, software, or a combination of the foregoing may be employed to implement the present invention or components thereof. One or more embodiments of the invention, or elements thereof, can be implemented In the form of a computer product including a computer usable medium with computer usable program code for performing the method steps indicated. Furthermore, one or more embodiments of the invention, or elements thereof, can be implemented in the form of an apparatus including a memory and at least one processor that is coupled to the memory and operative to perform exemplary method steps.

Figure 10:
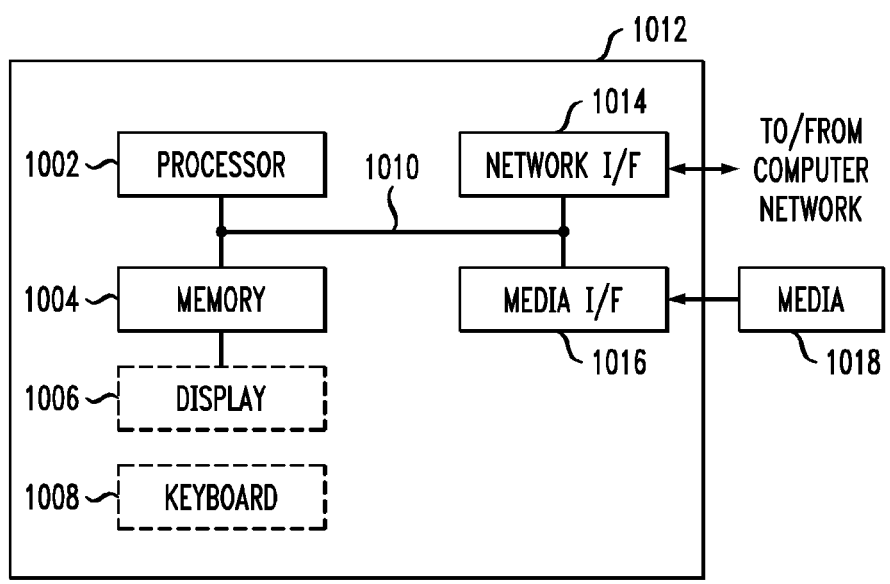
FIG. 10 depicts a computer system that may be useful in implementing one or more aspects and/or elements of the present invention.

One or more embodiments can make use of software running on a general purpose computer or workstation. With reference to FIG. 10, such an implementation might employ, for example, a processor 1002, a memory 1004, and an input/output interface formed, for example, by a display 1006 and a keyboard 1008. The term "processor" as used herein is intended to include any processing device, such as, for example, one that includes a CPU (central processing unit) and/or other forms of processing circuitry. Further, the term "processor" may refer to more than one individual processor. The term "memory" is Intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 1002, memory 1004, and input/output interface such as display 1006 and keyboard 1008 can be interconnected, for example, via bus 1010 as part of a data processing unit 1012. Suitable interconnections, for example via bus 1010, can also be provided to a network interface 1014, such as a network card, which can be provided to interface with, a computer network; and to a media interface 1016, such as a diskette or CD-ROM drive, which can be provided to interlace with media 1018.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium (for example, media 1018) providing program code for use by or in connection with a computer or any instruction execution system. For the purposes of this description, a computer usable or computer readable medium can be any apparatus for use by or in connection with the instruction execution system, apparatus, or device. The medium can store program code to execute one or more method steps set forth herein.

The medium can be an electronic, magnetic, optical, electromagnetic, infrared, or semiconductor system (or apparatus or device) or a propagation medium. Examples of a computer-readable medium include a semiconductor or solid-state memory (for example memory 1004), magnetic tape, a removable computer diskette (for example media 1018), a random access memory (RAM), a read-only memory (ROM), a rigid magnetic disk and an optical disk. Current examples of optical disks include compact disk-read only memory (CD-ROM), compact disk-read/write (CD-R/W) and DVD.

An exemplary data processing system, suitable for storing and/or executing program code, includes at least one processor 1002 coupled directly or indirectly to memory elements 1004 through a system bus 1010. The memory elements can Include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards 1008, displays 1006, pointing devices, and the like) can be coupled to the system either directly (such as via bus 1010) or through intervening I/O controllers (omitted for clarity).

Network adapters such as network interface 1014 may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the components illustrated herein may be implemented in various forms of hardware, software, or combinations thereof for example, application specific integrated circuits) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit, of the invention.

What is claimed is:

1. A method for identifying potential churning telephony customers, said method comprising the steps of:
obtaining data pertaining to telephone calls between a plurality of customers;
forming a graph having a plurality of nodes representing said customers and a plurality of edges representing said telephone calls between said customers;
denoting a sub-set of said customers as previously churned customers; and
applying a spreading activation model to said graph to identify, based on said graph and said previously churned customers, said potential churning customers, wherein applying said spreading activation model comprises:
activating a subset of said nodes of said graph;
assigning a spreading factor and a transfer function specifying a fraction of energy transferred by a given one of said subset of said nodes to corresponding neighboring nodes and a distribution of said transferred energy among said neighboring nodes; and
ceasing said iterative steps when said subset of activated nodes does not substantially change between successive iterations and when changes in energy between iterations for a given node are less than a predetermined accuracy threshold.

2. The method of claim 1, wherein said potential churning customers are identified as individuals.

3. The method of claim 1, wherein said potential churning customers are identified as groups.

4. The method of claim 1, wherein said step of applying said spreading activation model comprises the sub-step of applying weights to each of said plurality of edges based upon said nodes and said edges.

5. The method of claim 4, wherein said graph further comprises subgraphs and wherein said weights are further based upon said subgraphs.

6. The method of claim 5, wherein said weights are based upon said subgraphs by linearly scaling said weights of said edges by a factor D, where said factor D comprises density of a given one of said subgraphs, said density of said given one of said subgraphs in turn comprising a ratio of a number of edges for said given one of said subgraphs to a number of nodes for said given one of said subgraphs.

7. The method of claim 5, wherein:
said step of applying said spreading activation model comprises performing a plurality of iterative steps; and
said spreading activation model is based upon a plurality of parameters, said parameters in turn being based upon said nodes, said edges, and said subgraphs, said parameters comprising:
initial energy of nodes associated with said previously churned customers;
a fraction of energy propagated by each affected node to its neighboring nodes;
a normalization function to determine a substantially exact amount of energy that each of said neighboring receives from a corresponding one of said affected nodes; and
an accuracy threshold for predicting a given one of said affected nodes as a node corresponding to a given one of said potential churning customers;
wherein said affected nodes comprise, in a first one of said iterative steps, direct neighbor nodes of said previously churned customers, and in subsequent ones of said iterative steps, direct neighbor nodes of nodes which were ones of said affected nodes in an immediately previous one of said iterative steps.

8. The method of claim 1, further comprising the additional step of applying at least one additional churn prediction mechanism to said data, wherein said identification of said potential churning customers is based on said graph, said previously churned customers, and said at least one additional churn prediction mechanism.

9. The method of claim 8, wherein said spreading activation model and said at least one additional churn prediction mechanism are integrated using at least one of a set intersection and a set union.

10. The method of claim 1, further comprising the additional step of facilitating contact with at least a fraction of said potential churning customers to reduce a probability of said potential churning customers actually churning.

* * * * *